No. 888,589. PATENTED MAY 26, 1908.
E. P. COOPER.
DRIVE AND STEERING GEAR FOR AUTOMOBILE VEHICLES.
APPLICATION FILED FEB. 25, 1907.

6 SHEETS—SHEET 1.

Witnesses:
Lulu G. Greenfield
Clora E. Braden

Inventor,
Edward P. Cooper
By Chappell & Earl
Att'y.s

No. 888,589. PATENTED MAY 26, 1908.
E. P. COOPER.
DRIVE AND STEERING GEAR FOR AUTOMOBILE VEHICLES.
APPLICATION FILED FEB. 25, 1907.
6 SHEETS—SHEET 2.
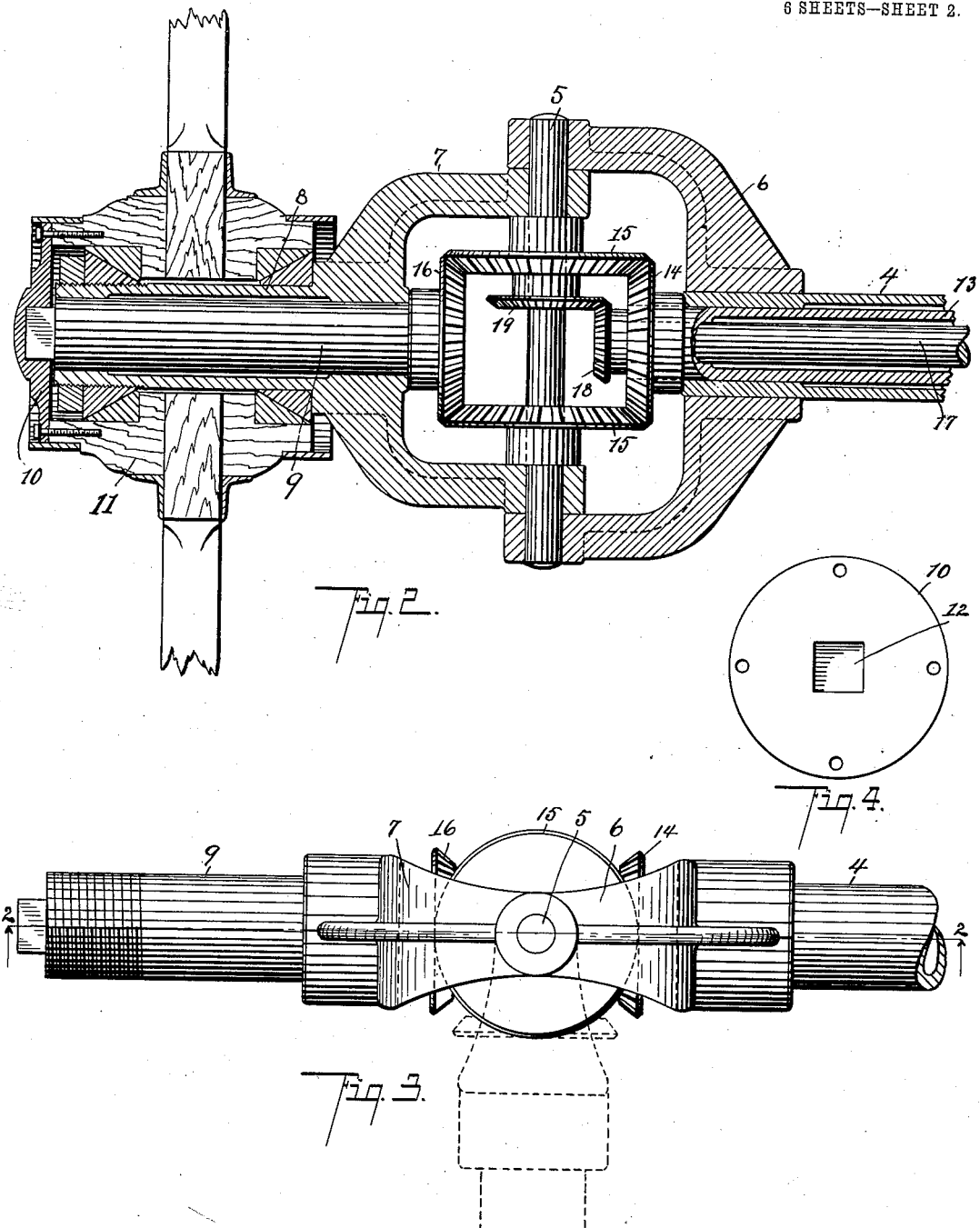
Witnesses:
Lulu G. Grunfeld
Clora E. Braden
Inventor,
Edward P. Cooper
By Chappell & Earl
Att'ys No. 888,589. PATENTED MAY 26, 1908.
E. P. COOPER.
DRIVE AND STEERING GEAR FOR AUTOMOBILE VEHICLES.
APPLICATION FILED FEB. 25, 1907.
6 SHEETS—SHEET 3.
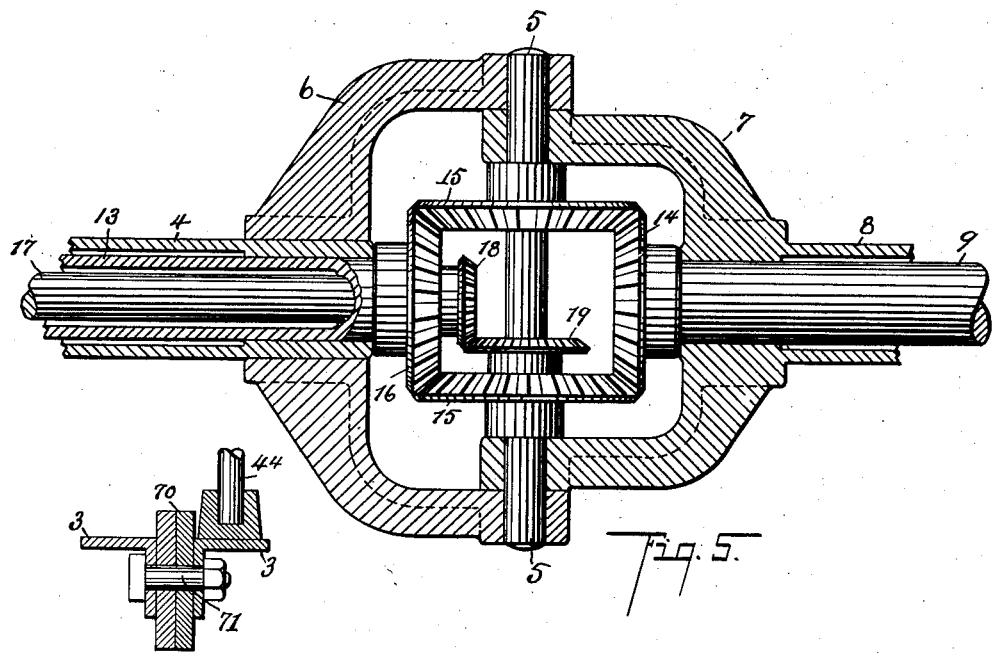
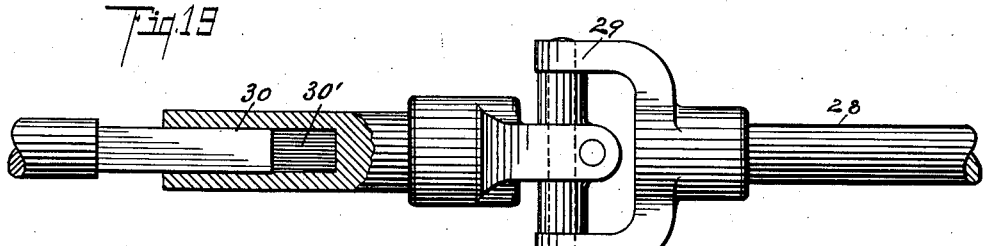
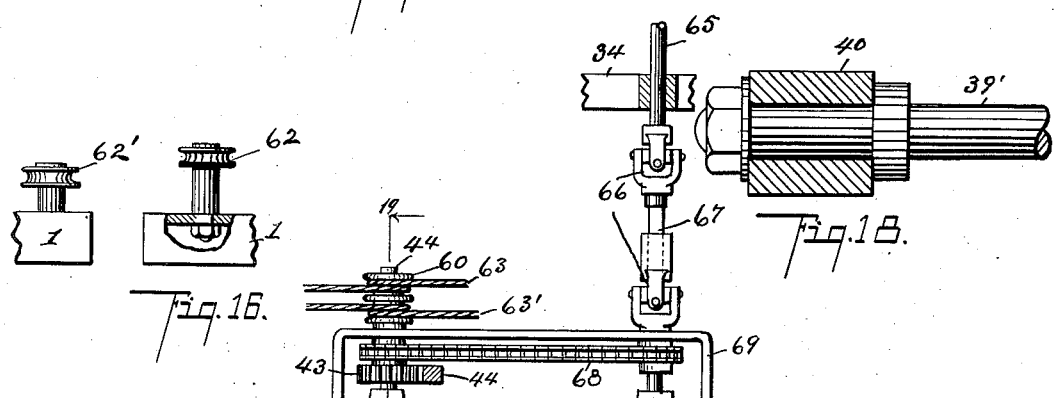
Witnesses: 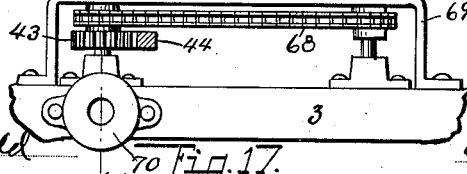
Inventor,
Edward P. Cooper
By Chappell & Earl
Att'y.s No. 888,589. PATENTED MAY 26, 1908.
E. P. COOPER.
DRIVE AND STEERING GEAR FOR AUTOMOBILE VEHICLES.
APPLICATION FILED FEB. 25, 1907.

6 SHEETS—SHEET 4.

Witnesses:
Lulu G. Grunfald
Clara E. Broden

Inventor,
Edward P. Cooper
By Chappell & Earl
Att'ys

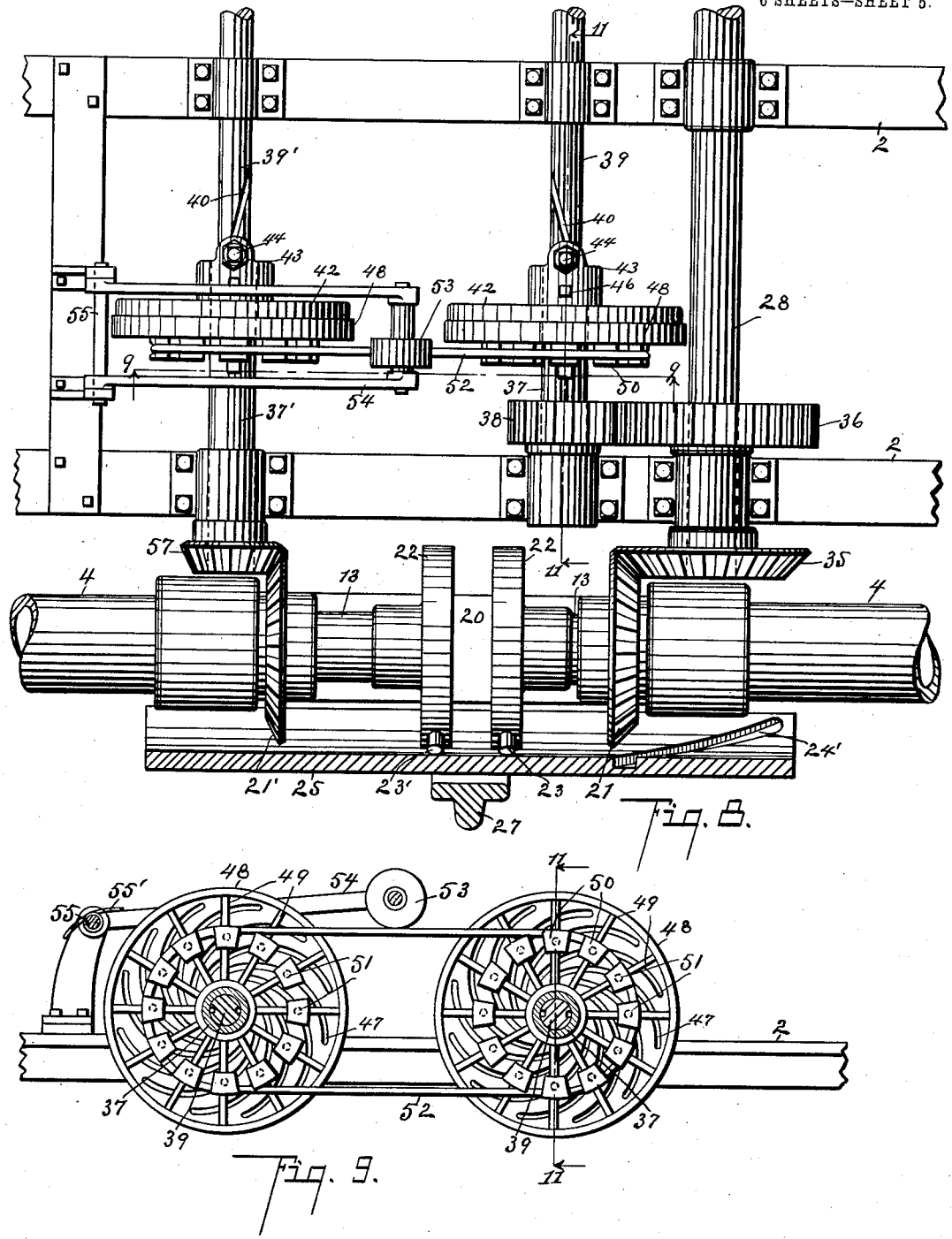

No. 888,589. PATENTED MAY 26, 1908.
E. P. COOPER.
DRIVE AND STEERING GEAR FOR AUTOMOBILE VEHICLES.
APPLICATION FILED FEB. 25, 1907.
6 SHEETS—SHEET 6.
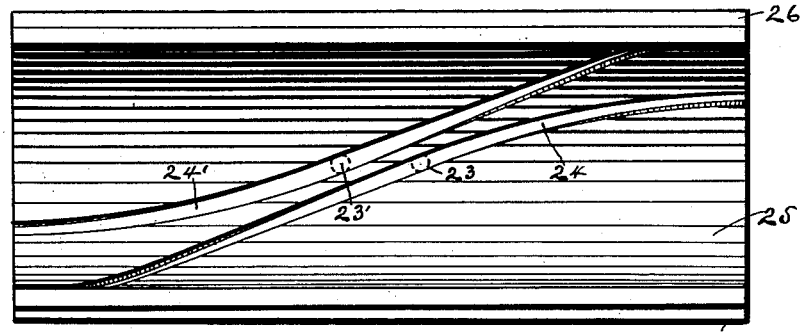
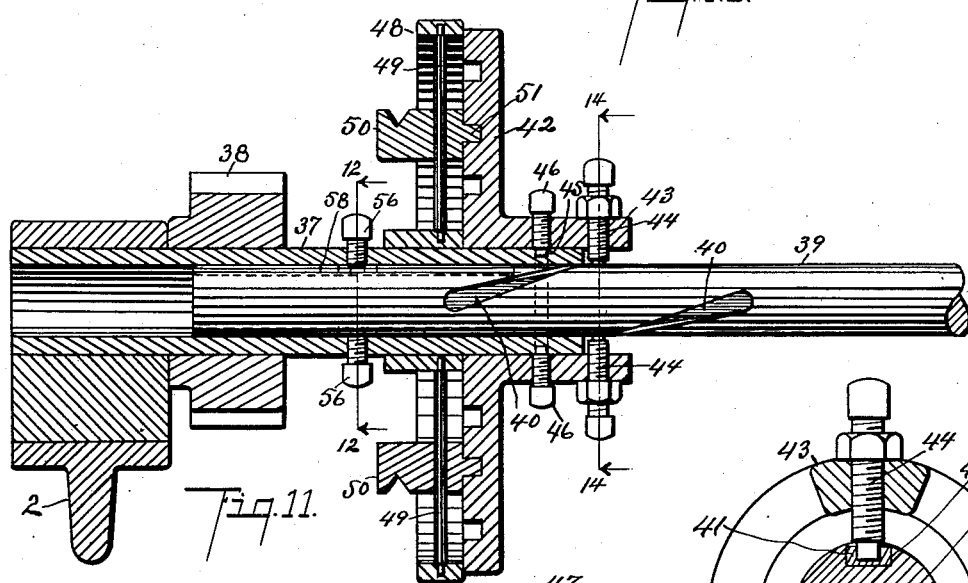
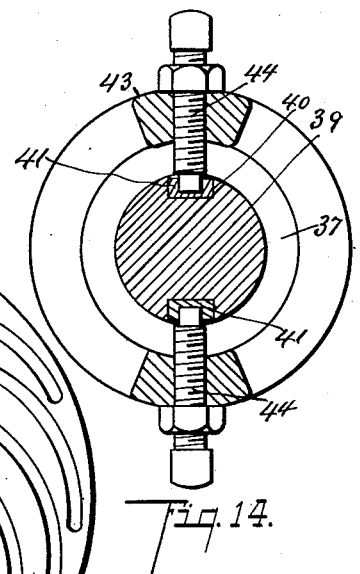
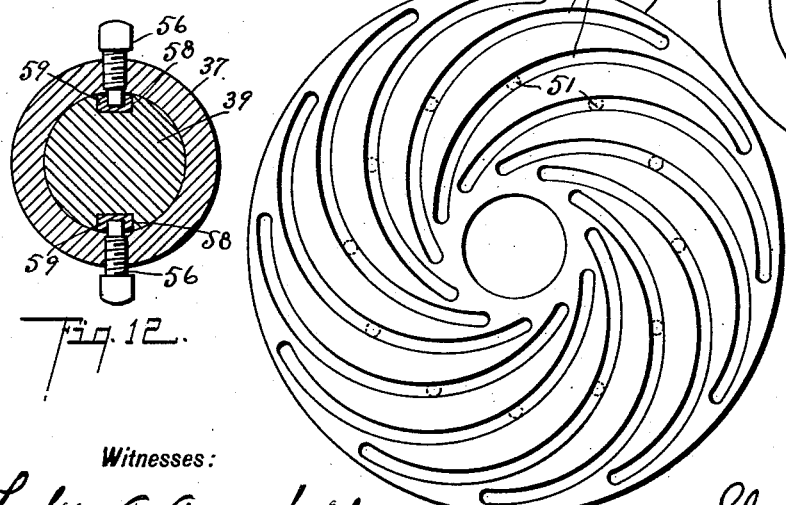
Witnesses:
Lulu G. Grunfeld
Clara E. Broden
Inventor,
Edward P. Cooper
By Chappell & Earl
Att'ys

UNITED STATES PATENT OFFICE.

EDWARD P. COOPER, OF PAW PAW, MICHIGAN, ASSIGNOR OF ONE-HALF TO OLIN JAMES COOPER, OF HILLSDALE, MICHIGAN.

DRIVE AND STEERING GEAR FOR AUTOMOBILE VEHICLES.

No. 888,589.  Specification of Letters Patent.  Patented May 26, 1908.

Application filed February 25, 1907. Serial No. 359,083.

*To all whom it may concern:*

Be it known that I, EDWARD P. COOPER, a citizen of the United States, residing at Paw Paw, county of Van Buren, and State of Michigan, have invented certain new and useful Improvements in Drive and Steering Gear for Motor-Vehicles, of which the following is a specification.

This invention relates to improvements in vehicles.

The objects of this invention are, first, to provide in a vehicle an improved steering gear by which the wheels are maintained in their proper relations to prevent skidding in turning the vehicle. Second, to provide in a motor vehicle an improved driving gear. Third, to provide in a motor vehicle an improved driving gear in which the wheels are driven at their proper relative speeds in turning to prevent skidding.

Further objects, and objects relating to details of construction, will definitely appear from the detailed description to follow.

I accomplish the objects of my invention by the devices and means described in the following specification.

The invention is clearly defined and pointed out in the claims.

Figure 1:
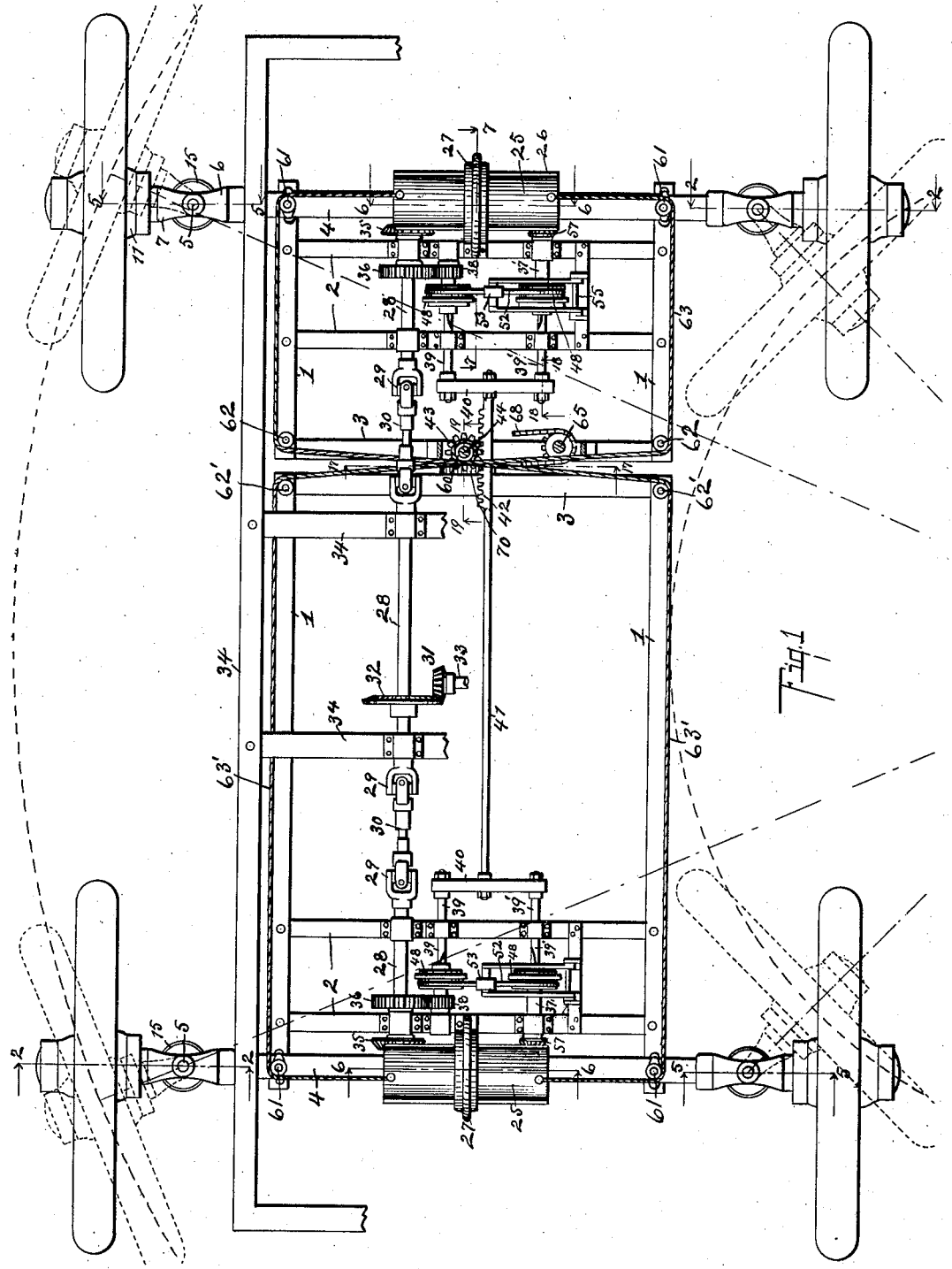
Figure 6:
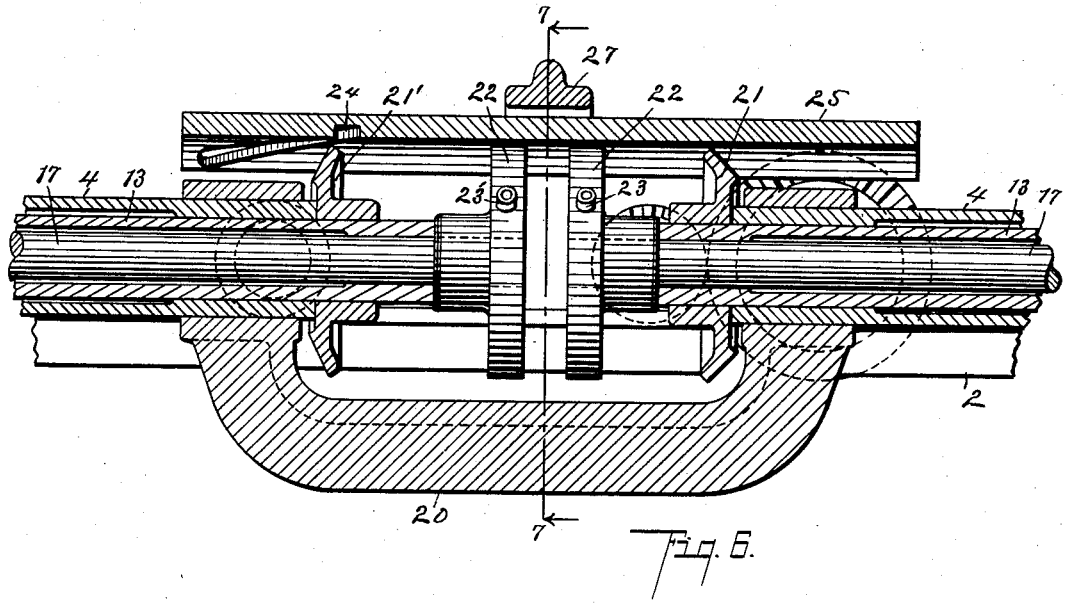
Figure 7:
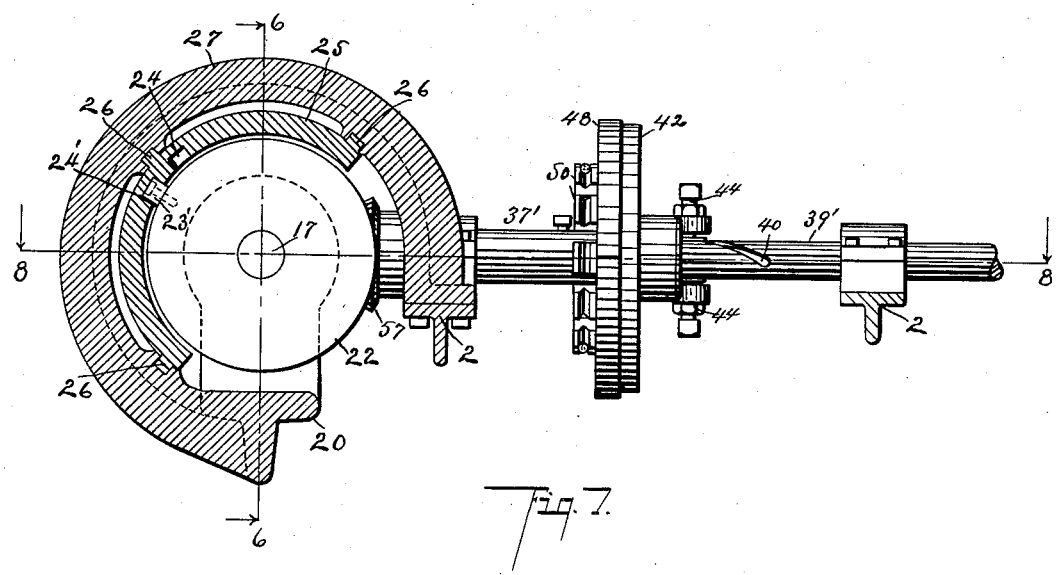

A structure embodying the features of my invention is clearly illustrated in the accompanying drawing, forming a part of this specification, in which, Figure 1 is a detail plan of a structure embodying the features of my invention, the body being removed and part of the body frame being broken away, the relative positions assumed by the wheels in making a turn being indicated by dotted lines. Fig. 2 is an enlarged detail section taken on a line corresponding to lines 2—2 of Figs. 1 and 3, showing details of the driving connections for the wheels and of the steering gear. Fig. 3 is a detail plan of the structure appearing in Fig. 2, the carrying wheel 11 being removed. Fig. 4 is an inside view of the cap plate 10 by which the spindle shaft 9 is connected to the wheels. Fig. 5 is a detail section corresponding to that of Fig. 2, taken on a line corresponding to lines 5—5 of Fig. 1. Fig. 6 is an enlarged detail section taken on a line corresponding to lines 6—6 of Figs. 1 and 7, showing details of the driving and steering mechanism. Fig. 7 is a detail section taken on a line corresponding to line 7—7 of Fig. 6. Fig. 8 is an enlarged detail plan, partially in section, taken on a line corresponding to line 8—8 of Fig. 7, showing further details of the driving and steering mechanism. Fig. 9 is a detail vertical section taken on a line corresponding to line 9—9 of Fig. 8, showing details of the means for varying the relative speed of the wheels in turning. Fig. 10 is an enlarged inverted plan of the plates 25 of the steering mechanism. Fig. 11 is an enlarged vertical section taken on a line corresponding to line 11—11 of Fig. 8. Fig. 12 is an enlarged section taken on a line corresponding to line 12—12 of Fig. 11. Fig. 13 is a side elevation of one of the transmission disk gear 42. Fig. 14 is an enlarged section taken on a line corresponding to line 14—14 of Fig. 11. Fig. 15 is an enlarged detail partially in section of the driving shaft, showing one of the flexible joints thereof. Fig. 16 is an enlarged detail showing the guide pulleys 62 and 62' for the steering cable. Fig. 17 is an enlarged detail section taken on line 17—17 of Fig. 1, showing details of the steering rod and connections. Fig. 18 is an enlarged detail taken on a line corresponding to line 18—18 of Fig. 1. Fig. 19 is an enlarged detail taken on line 19—19 of Fig. 1, showing details of the steering mechanism.

In the drawing, the sectional views are taken looking in the direction of the little arrows at the ends of the section lines, and similar reference characters refer to similar parts throughout the several views.

Referring to the drawing, the axles are rigidly connected to the front and rear axle frames. These axle frames preferably consist of the side bars 1 and cross bars 2 and 3 on which the driving and steering gear are mounted. The axle frames are connected by a centrally arranged swivel joint 70. The axles are provided with spindles 8, which are pivotally connected thereto by means of the yokes 6 and 7, the yoke 6 being secured to the axle and the yoke 7 being secured to the spindle, the connecting pivots 5 for the yokes being arranged vertically. The pivots 5 are fixed to the spindle yokes 7 and are free to revolve in the axle yokes 6. The axles are preferably made up of hollow sections 4 connected by centrally-arranged yokes 20; see Fig. 6.

Within the axles are tubular driving shafts 13, having gears 14 at their outer ends arranged to mesh with the gears 15 mounted on the spindle pivots 5. The spindles 8 are hollow and are provided with suitable bearings for the spindle shafts 9, which are provided with gears 16 on their inner ends arranged to mesh with the gears 15. Through this connection the spindle shafts 9 are driven and the spindles are left free to swing on their pivots. The outer ends of the shafts 9 are preferably squared and adapted to engage the sockets 12 in the cap-plates 10 on the outer ends of the hubs of the wheels 11, which are provided with suitable bearings on the spindles 8. I preferably provide a pair of the gears 15 to connect the gears 14 and 16, as I am thus enabled to use lighter gears and the strain on the shafts is reduced to a minimum.

Within the driving shafts 13, I arrange steering shafts 17, which are connected to the pivots for the wheel spindles by the gears 18 and 19, the gears 19 being secured to the spindles and the gears 18 to the shafts. The gears 18 and 19 are arranged so that they are embraced by the gears 14, 15 and 16, thus making a very compact arrangement. On the inner ends of the shafts 13 are gears 21 and 21', which are arranged to mesh with the gears 35 and 57 on the shafts 28 and 37'. The driving connection for these shafts will be later described in detail.

On the inner ends of the steering shafts 17 are wheels 22 having radially-arranged pins 23 and 23', on the peripheries thereof. Supported above these wheels 22 are plates 25, curved in cross section to correspond to the peripheries of the wheels, having grooves 24 and 24' in its inner face adapted to receive the pins 23 and 23', respectively; see Figs. 6, 7 and 10. The plates 25 are slidably mounted within the frames 27, the plates being preferably provided with suitable rib-like guides 26, which engage suitable ways provided therefor in the frames.

The grooves 24 and 24' are arranged diagonally of the steering plates and diverge from a central point, the central point being indicated by the position of the pins 23 and 23', Fig. 10. It will be observed that, when the steering plate is shifted, the steering shafts 17 are rocked in their bearings, thereby turning the wheels on their spindle pivots. On account of the constantly varying angles which the wheels would assume in turning, in order to prevent skidding, the grooves 24 and 24' are substantially straight at one side of the central point and curved outwardly or away from the other groove on the opposite side of the center. Through this means, I am enabled to secure the proper turning of the wheels on their spindle pivots to eliminate skidding of any of the wheels on any curve it is desired to make. I preferably shift the steering plates 25 by means of the cables 63 and 63', which are connected to the drums 60 on the shaft 44. The cables 63 for the forward steering plate are arranged over the guide pulleys 61 and 62, the cables being connected at each end of the steering plates, as clearly appears in Fig. 1, the pulleys 61 being preferably located on the front axle and the pulleys 62 being located at the rear end of the front frame to properly guide the cables to the steering rod. The cables for the rear steering plate are correspondingly arranged on the rear axle and frame.

To prevent variations in the tension on the steering cables in the movement of the axle frames relative to each other the shaft 44 is located above the swivel connections for the frames. The steering rod 65 is connected to the shaft 44 by the sprocket 68 which permits the locating of the steering rod at any desired point. The steering rod is preferably provided with a flexible portion consisting of the universal joints 66, having a slip connection 67, which permits of the movement of the body frame 34 by which the upper section of the steering rod is carried.

The shafts 44 and the lower sections of the steering rod are preferably supported by a bracket 69. See Fig. 17. The shaft 28 is preferably connected to the power by means of the shaft 33 and gears 31 and 32. The shaft 28 is made up of sections, the central section being mounted on the vehicle body frame 34 and the end sections on the front and rear axle frame. The shaft sections are connected by flexible connections preferably consisting of the universal couplings 29, one of which is provided with a squared or irregular member arranged in a corresponding socket 30 in the other, thereby securing a slip joint. This allows free movement of the vehicle body relative to the axle frame.

Inasmuch as it is necessary to vary the relative speed of the wheels in turning, in order to prevent sliding, I preferably use a mechanism adapted to accomplish this in connection with my improved steering mechanism. This varying speed drive I preferably accomplish by the following described mechanism: A transmission shaft 37, arranged parallel with the shaft 37', before referred to, is connected to the driving shaft 28 by means of the gears 36 and 38, the gear 36 being arranged on the shaft 28, and the gear 38 on the transmission shaft 37. On the shafts 37 and 37' are disks 42, having a plurality of tangentially-arranged grooves 47 on their faces. These grooves are preferably curved as clearly appears in Figs. 9 and 13. Wheels 48, having rod-like spokes 49, are arranged against the grooved faces of these disks, as clearly appears in Fig. 11. On the spokes of the wheels 48 I arrange a plurality of belt rim blocks 50, having projecting pins on their rear ends adapted to engage the grooves 47 in the disks 42, the rim blocks being slidably arranged on the spokes, so that, when the disks are shifted, the blocks are carried in or out, thereby varying the size of the belt rim. The wheels 48 are secured to the shafts 37 and 37' to revolve therewith. The disks 42 are adjustably mounted thereon, so that they may be adjusted to vary the belt rims. The wheels 48 are connected by a belt 52, as clearly appears in Fig. 8. This belt is preferably provided with a belt tightener consisting of the wheel 53 carried by the arms 54, the wheel being arranged so that it normally travels or rests upon the belt. The arms 54 are pivoted at 55.

A spring as 55' is provided for applying tension to the tightener. The disks 42 are preferably shifted by means of the rods 39 and 39', which are provided with spiral grooves 40. Through the hubs 43 of the disks 42 are screws 44, adapted to engage these grooves 40, so that, when the rods 49 are shifted longitudinally, the disks are shifted on the shafts 37 and 37'. The disks 42 are preferably connected to the shafts by means of the set screws 46 arranged through the hubs thereof to engage the annular grooves 45 in the shafts. Turning of the rods 39 in the shafts is prevented by the key blocks 59 which are arranged in suitable key ways formed in the rods. The key blocks are carried by the set screws 56. The rods 39 are connected by the cross pieces or coupling bars 40 (see Figs. 1 and 8) so that they may be operated together. The grooves in the rods are so arranged that the disks 42 are shifted in opposite directions, thereby increasing the diameter of one belt rim and decreasing the diameter of its companion belt rim. The cross pieces 40 are secured together by means of the rod 41, which is provided with a rack 42, with which the pinion 43 on the shaft 44 is arranged to mesh. By thus arranging the parts, the relative speed at which the wheels are driven is regulated through the steering rod. By thus arranging and connecting the parts, I secure a mechanism by which a vehicle may be turned on any desired curve without skidding or sliding of any of the wheels. While I prefer to use the driving and steering mechanism, as illustrated, in combination, it is evident that they may be used independently with desirable results.

I have, in the foregoing description and in the accompanying drawing, illustrated and described my improved driving and steering gear in detail in the form preferred by me on account of the structural simplicity and economy. I am, however, aware that it is capable of very great variation in structural details without departing from my invention, and I desire to be understood as claiming the same specifically, as illustrated, as well as broadly.

Having thus described my invention, what I claim as new and desire to secure by Letters Patent is:

1. The combination of the front and rear frames; a swivel connection for said frames; hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a pair of adjustably-mounted plates curved in cross section having a pair of diagonally-arranged grooves in their inner faces, said grooves diverging in each direction from a central point, each groove being substantially straight on one side of its central point and curved on the other; pins carried by said steering shafts arranged to engage the grooves in said plates; a steering rod; connecting cables for said steering rod to said plates whereby they are adjusted; guide pulleys for said cables, the guide pulleys for the front plate being arranged on the said front frame and those for the rear plate being arranged on the said rear frame; a driving shaft; gear connections therefor to a pair of the said axle shafts; transmission shafts arranged in pairs; gear connections for one of each pair of said transmission shafts to said driving shaft and for the other pair of said transmission shafts to the other pair of axle shafts; driving connections for said pairs of transmission shafts, consisting of wheels having rod-like spokes to said shafts, rim blocks slidably mounted on said spokes, disks having tangentially-arranged grooves in their inner faces adapted to engage said blocks whereby, when said disks are adjusted, said blocks are shifted on said spokes, adjusting rods for said disks having spirally-arranged grooves therein, and pins on said disks arranged to engage said grooves whereby, when said rods are shifted longitudinally, said disks are adjusted; connecting belts for said transmission wheels; connecting bars for said adjusting rods; and a connecting rod for said bars connected to said steering rod, all coacting for the purpose specified.

2. The combination of hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a pair of adjustably-mounted plates curved in cross section having a pair of diagonally-arranged grooves in their inner faces said grooves diverging in each direction from a central point, each groove being substantially straight on one side of its central point and curved on the other; pins carried by said steering shafts arranged to engage the grooves in said plates; a steering rod; connections for said steering rod to said plates whereby they are adjusted; a driving shaft; gear connections therefor to a pair of the said axle shafts; transmission shafts arranged in pairs; gear connections for one of each pair of said transmission shafts to said driving shaft and for the other pair of said transmission shafts to the other pair of axle shafts; driving connections for said pairs of transmission shafts, consisting of wheels having rod-like spokes secured to said shafts, rim blocks slidably mounted on said spokes, disks having tangentially-arranged grooves in their inner faces adapted to engage said blocks whereby, when said disks are adjusted, said blocks are shifted on said spokes; adjusting rods for said disks having spirally-arranged grooves therein, and pins on said disks arranged to engage said grooves whereby, when said rods are shifted longitudinally, said disks are adjusted; connecting belts for said transmission wheels; connecting bars for said adjusting rods; and a connecting rod for said bar connected to said steering rod, all coacting for the purpose specified.

3. The combination of the front and rear frames; a swivel connection for said frames; hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a pair of adjustably-mounted plates curved in cross section having a pair of diagonally-arranged grooves in their inner faces, each groove being substantially straight on one side of its central point and curved on the other; pins carried by said steering shafts arranged to engage the grooves in said plates; a steering rod; connecting cables for said steering rod to said plates whereby they are adjusted; guide pulleys for said cables, the guide pulleys for the front plate being arranged on the said front frame and those for the rear plate being arranged on the said rear frame; a driving shaft; gear connections therefor to a pair of the said axle shafts; transmission shafts arranged in pairs; gear connections for one of each pair of said transmission shafts to said driving shaft; variable speed connections for said pairs of transmission shafts; and connections for said variable speed mechanisms to said steering rod whereby they are controlled, all coacting for the purpose specified.

4. The combination of hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a pair of adjustably-mounted plates curved in cross section having a pair of diagonally-arranged grooves in their inner faces, said grooves diverging in each direction from a central point each groove being substantially straight on one side of its central point and curved on the other; pins carried by said steering shafts arranged to engage the grooves in said plates; a steering rod; connections for said steering rod to said plates whereby they are adjusted; a driving shaft; gear connections therefor to a pair of the said axle shafts; transmission shafts arranged in pairs; gear connections for one of each pair of said transmission shafts to said driving shaft and for the other pair of said transmission shafts to the other pair of axle shafts; variable speed driving connections for said pairs of transmission shafts; and connections for said variable speed mechanisms to said steering rod whereby they are controlled, all coacting for the purpose specified.

5. The combination of the front and rear frames; a swivel connection for said frames; hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a pair of adjustably-mounted plates curved in cross section having a pair of diagonally-arranged grooves in their inner faces, said grooves diverging in each direction from a central point, each groove being substantially straight on one side of its central point and curved on the other; pins carried by said steering shafts arranged to engage the grooves in said plates; a steering rod; connecting cables for said steering rod to said plates whereby they are adjusted; guide pulleys for said cables, the guide pulleys for the front plate being arranged on the said front frame and those for the rear plate being arranged on the said rear frame; and driving connections for said axle shafts, all coacting for the purpose specified.

6. The combination of hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a pair of adjustably-mounted plates curved in cross section having a pair of diagonally-arranged grooves in their inner faces, said grooves diverging in each direction from a central point, each groove being substantially straight on one side of its central point and curved on the other; pins carried by said steering shafts arranged to engage the grooves in said plates; connections for said steering rod to said plates whereby they are adjusted; and driving connections for said axle shafts, all coacting for the purpose specified.

7. The combination of the front and rear frames; a swivel connection for said frames; hollow axles; hollow spindles for said axles; vertically-arranged pivots for connecting said spindles to said axles; tubular axle shafts arranged in said axles; spindle shafts arranged in said spindles; gears on said axles and spindle shafts; a steering rod; connecting gears for said axle and spindle shaft gears mounted on the said spindle pivots; wheels mounted on said axle spindles and connected to said spindle shafts; steering shafts arranged in said axle shafts; gears on the outer ends of steering shafts; gears secured to said spindle pivots and arranged to mesh with said gears on said steering shafts; a pair of adjustably-mounted plates curved in cross section having a pair of diagonally-arranged grooves in their inner faces; pins carried by said steering shafts arranged to engage the grooves in said plates; a steering rod; connecting cables for said steering rod to said plates whereby they are adjusted; guide pulleys for said cables, the guide pulleys for the front plate being arranged on the said front frame and those for the rear plate being arranged on the said rear frame; a driving shaft; gear connections therefor to a pair of the said axle shafts; transmission shafts arranged in pairs; gear connections for one of each pair of said transmission shafts to said driving shaft and for the other pair of said transmission shafts to the other pair of axle shafts; driving connections for said pairs of transmission shafts, consisting of wheels having rod-like spokes secured to said shafts, rim blocks slidably mounted on said spokes, disks having tangentially-arranged grooves in their inner faces adapted to engage said blocks whereby, when said disks are adjusted, said blocks are shifted on said spokes, adjusting rods for said disks having spirally-arranged grooves therein, and pins on said disks arranged to engage said grooves whereby, when said rods are shifted longitudinally, said disks are adjusted; connecting belts for said transmission wheels; connecting bars for said adjusting rods; and a connecting rod for said bars connected to said steering rod, all coacting for the purpose specified.

8. The combination of hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a pair of adjustably-mounted plates curved in cross section having a pair of diagonally-arranged grooves in their inner faces; pins carried by said steering shafts arranged to engage the grooves in said plates; a steering rod; connections for said steering rod to said plates whereby they are adjusted; a driving shaft; gear connections therefor to a pair of the said axle shafts; transmission shafts arranged in pairs; gear connections for one of each pair of said transmission shafts to said driving shaft and for the other pair of said transmission shafts to the other pair of axle shafts; driving connections for said pairs of transmission shafts, consisting of wheels having rod-like spokes secured to said shafts, rim blocks slidably mounted on said spokes, disks having tangentially-arranged grooves in their inner faces adapted to engage said blocks whereby, when said disks are adjusted, said blocks are shifted on said spokes, adjusting rods for said disks having spirally-arranged grooves therein, and pins on said disks arranged to engage said grooves whereby, when said rods are shifted longitudinally, said disks are adjusted; connecting belts for said transmission wheels; connecting bars for said adjusting rods; and a connecting rod for said bars connected to said steering rod, all coacting for the purpose specified.

9. The combination of the front and rear frames; a swivel connection for said frames; hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a pair of adjustably-mounted plates curved in cross section having a pair of diagonally-arranged grooves in their inner faces; pins carried by said steering shafts arranged to engage the grooves in said plates; a steering rod; connecting cables for said steering rod to said plates whereby they are adjusted; guide pulleys for said cables, the guide pulleys for the front plate being arranged on the said front frame and those for the rear plate being arranged on the said rear frame; a driving shaft; gear connections therefor to a pair of the said axle shafts; transmission shafts arranged in pairs; gear connections for one of each pair of said transmission shafts to said driving shaft and for the other pair of said transmission shafts to the other pair of axle shafts; variable speed driving connections for said pairs of transmission shafts; and connections for said variable speed mechanisms to said steering rod whereby they are controlled, all coacting for the purpose specified.

10. The combination of hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivot; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a pair of adjustably-mounted plates curved in cross section having a pair of diagonally-arranged grooves in their inner faces; pins carried by said steering shafts arranged to engage the grooves in said plates; a steering rod; connections for said steering rod to said plates whereby they are adjusted; a driving shaft; gear connections therefor to a pair of the said axle shafts; transmission shafts arranged in pairs; gear connections for one of each pair of said transmission shafts to said driving shaft and for the other pair of said transmission shafts to the other pair of axle shafts; variable speed driving connections for said pairs of transmission shafts; and connections for said variable speed mechanisms to said steering rod whereby they are controlled, all coacting for the purpose specified.

11. The combination of the front and rear frames; a swivel connection for said frames; hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a pair of adjustably-mounted plates curved in cross section having a pair of diagonally-arranged grooves in their inner faces; pins carried by said steering shafts arranged to engage the grooves in said plates; a steering rod; connecting cables for said steering rod to said plates whereby they are adjusted; guide pulleys for said cables, the guide pulleys for the front plate being arranged on the said front frame and those for the rear plate being arranged on the said rear frame; and driving connections for said axle shafts, all coacting for the purpose specified.

12. The combination of hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a pair of adjustably-mounted plates curved in cross section having a pair of diagonally-arranged grooves in their inner faces; pins carried by said steering shafts arranged to engage the grooves in said plates; a steering rod; connections for said steering rod to said plates whereby they are adjusted; and driving connections for said axle shafts, all coacting for the purpose specified.

13. The combination of the front and rear frames; a swivel connection for said frames; hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a steering rod; connections for said steering rod to said steering shafts; a driving shaft; gear connections therefor to a pair of the said axle shafts; transmission shafts arranged in pairs; gear connections for one of each pair of said transmission shafts to said driving shaft and for the other pair of said transmission shafts to the other pair of axle shafts; variable speed driving connections for said pairs of transmission shafts; and connections for said variable speed mechanisms to said steering rod whereby they are controlled, all coacting for the purpose specified.

14. The combination of hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a steering rod; connections for said steering rod to said steering shafts; a driving shaft; gear connections therefor to a pair of the said axle shafts; transmission shafts arranged in pairs; gear connections for one of each pair of said transmission shafts to said driving shaft and for the other pair of said transmission shafts to the other pair of axle shafts; variable speed driving connections for said pairs of transmission shafts; and connections for said variable speed mechanisms to said steering rod whereby they are controlled, all coacting for the purpose specified.

15. The combination of the front and rear frames; a swivel connection for said frames; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a steering rod; connections for said steering rod to said steering shafts; and driving connections for said axle shafts, all coacting for the purpose specified.

16. The combination of hollow axles; hollow spindles for said axles; vertically-arranged pivots for connecting said spindles to said axles; tubular axle shafts arranged in said axles; spindle shafts arranged in said spindles; gears on said axles and spindle shafts; connecting gears for said axle and spindle shaft gears mounted on the said spindle pivots; wheels mounted on said axle spindles and connected to said spindle shafts; steering shafts arranged in said axle shafts; gears on the outer ends of said steering shafts; gears secured to said spindle pivots and arranged to mesh with said gears on said steering shafts; a steering rod; connections for said steering rod to said steering shafts; and driving connections for said axle shafts, all coacting for the purpose specified.

17. The combination of the hollow axles; hollow spindles for said axles; vertically-arranged pivots for connecting said spindles to said axles; axle shafts arranged in said axles; spindle shafts arranged in said spindles; gears on said axle and spindle shafts; connecting gears for said axle and spindle shaft gears mounted on the said spindle pivots; wheels mounted on said axle spindles connected to said spindle shafts; a driving shaft; gear connections therefor to a pair of the said axle shafts; transmission shafts arranged in pairs; gear connections for one of each pair of transmission shafts to said driving shaft and for the other pair of said transmission shafts to the other pair of axle shafts; variable speed driving connections for said pairs of transmission shafts, consisting of wheels having rod-like spokes, secured to said shafts, rim blocks slidably-mounted on said spokes, disks having tangentially-arranged grooves in their inner faces adapted to engage said blocks whereby, when said disks are adjusted, said blocks are shifted on said spokes, means for adjusting said disks, adjusting rods for said disks having spirally-arranged grooves therein, and pins on said disks arranged to engage said grooves whereby, when said rods are shifted longitudinally, said disks are adjusted; connecting belts for said transmission wheels; connecting bars for said adjusting rods; a connecting rod for said bars; and adjusting means therefor.

18. The combination of the hollow axles; hollow spindles for said axles; vertically-arranged pivots for connecting said spindles to said axles; axle shafts arranged in said axles; spindle shafts arranged in said spindles; gears on said axle and spindle shafts; connecting gears for said axle and spindle shaft gears mounted on the said spindle pivots; wheels mounted on said axle spindles connected to said spindle shafts; a driving shaft; gear connections therefor to a pair of the said axle shafts; transmission shafts arranged in pairs; gear connections for one of each pair of said transmission shafts to said driving shaft and for the other pair of said transmission shafts to the other pair of axle shafts; variable speed driving connections for said pairs of transmission shafts, consisting of wheels, having rod-like spokes, secured to said shafts, rim blocks, slidably-mounted on said spokes, disks having tangentially-arranged grooves in their inner faces adapted to engage said blocks whereby, when said disks are adjusted, said blocks are shifted on said spokes; and connecting belts for said transmission wheels.

19. The combination of the hollow axles; hollow spindles for said axles; vertically-arranged pivots for connecting said spindles to said axles; axle shafts arranged in said axles; spindle shafts arranged in said spindles gears on said axle and spindle shafts; connecting gears for said axle and spindle shaft gears mounted on the said spindle pivots; wheels mounted on said axle spindles connected to said spindle shafts; a driving shaft; gear connections therefor to a pair of the said axle shafts; transmission shafts arranged in pairs; gear connections for one of each pair of said transmission shafts to said driving shaft and for the other pair of said transmission shafts to the other pair of axle shafts; variable speed driving connections for said transmission shafts; and connecting means for said variable speed mechanisms whereby they are adjusted together.

20. The combination of the hollow axle; hollow spindles for said axle; vertically-arranged pivots for connecting said spindles to said axle; axle shafts arranged in said axle; spindle shafts arranged in said spindles; gears on said axle and spindle shafts; connecting gears for said axle and spindle shafts mounted on said spindle pivots; wheels mounted on said axle spindles connected to said spindle shafts; a driving shaft; driving connections therefor to one of said axle shafts; a pair of transmission shafts; driving connections for one of said transmission shafts to said driving shaft and for the other transmission shaft to the other of said axle shafts; a variable speed driving connection for said pairs of transmission shafts consisting of wheels having rod-like spokes secured to said transmission shafts, rim blocks slidably-mounted on said spokes, disks having tangentially-arranged grooves in their inner faces adapted to engage said blocks whereby, when said disks are adjusted, said blocks are shifted on said spokes, adjusting rods for said disks having spirally-arranged grooves therein, pins on said disks arranged to engage said grooves whereby, when said rods are shifted longitudinally, said disks are adjusted, the said grooves being oppositely arranged in said rods, whereby the disks are adjusted oppositely; a connecting belt for said transmission wheels, said adjusting rods being connected so that they are shifted together.

21. The combination of the hollow axle; hollow spindles for said axles; vertically-arranged pivots for connecting said spindles to said axle; axle shafts arranged in said axle; spindle shafts arranged in said spindles; gears on said axle and spindle shafts; connecting gears for said axle and spindle shafts mounted on said spindle pivots; wheels mounted on said axle spindles connected to said spindle shafts; a driving shaft; driving connections therefor to one of said axle shafts; a pair of transmission shafts; driving connections for one of said transmission shafts to said driving shaft and for the other transmission shaft to the other of said axle shafts; a variable speed driving connection for said pairs of transmission shafts consisting of wheels having rod-like spokes secured to said transmission shafts, rim blocks slidably-mounted on said spokes, disks having tangentially-arranged grooves in their inner faces adapted to engage said blocks, whereby, when said disks are adjusted, said blocks are shifted on said spokes, and means for adjusting said disks in unison; and a connecting belt for said transmission wheels.

22. The combination of the hollow axle; hollow spindles for said axle; vertically-arranged pivots for connecting said spindles to said axle; axle shafts arranged in said axle; spindle shafts arranged in said spindles; gears on said axle and spindle shafts; connecting gears for said axle and spindle shafts mounted on said spindle pivots; wheels mounted on said axle spindles connected to said spindle shafts; a driving shaft; driving connections therefor to one of said axle shafts; a pair of transmission shafts; driving connections for one of said transmission shafts to said driving shaft and for the other transmission shaft to the other of said axle shafts; and a variable speed driving connection for said pairs of transmission shafts.

23. The combination of the hollow axle; hollow spindles for said axle; vertically-arranged pivots for connecting said spindles to said axles; a pair of axle shafts arranged in said axles; spindle shafts arranged in said spindles; gears on said axle and spindle shafts; a connecting gear for said axle and spindle shaft mounted on said spindle pivots;

wheels mounted on said axle spindles connected to said spindle shafts; and driving means for said axle shafts embracing a variable speed mechanism, whereby the said axle shafts are positively driven at varying relative speeds in turning the vehicle.

24. The combination of the hollow axle; hollow spindles for said axle; yokes arranged in pairs on said axle and spindles; vertical pivots for said yokes; an axle shaft arranged in said axle; spindle shafts arranged in said spindles; gears on said axle and spindle shafts arranged within said yokes; connecting gears for said axle and spindle shaft gears arranged in facing pairs on said pivots for said yokes, between the arms thereof; the diameter of said connecting gears being greater than that of said gears on said axle shaft whereby the said wheel spindles may be turned substantially at right angles to said axle shafts; wheels mounted on said axle spindles connected to said spindle shafts; and driving connections for said axle shafts.

25. The combination of the axle; spindles for said axle; vertically-arranged pivots for connecting said spindles to said axle; a pair of axle shafts arranged in said axle; spindle shafts arranged in said spindles; gears on said axle and spindle shafts; a connecting gear for said axle and spindle shaft mounted on said pivots; wheels mounted on said axle spindles connected to said spindle shafts; and driving means for said axle shafts embracing a variable speed mechanism whereby the said axle shafts are positively driven at varying relative speeds in turning the vehicle.

26. The combination of the axle; spindles for said axle; yokes arranged in pairs on said axle and spindles; vertical pivots for said yokes; an axle shaft arranged in said axle; spindle shafts arranged in said spindles; gears on said axle and spindle shafts arranged within said yokes; connecting gears for said axle and spindle shaft gears arranged in facing pairs on said pivots for said yokes, between the arms thereof; the diameter of said connecting gears being greater than that of said gears on said axle shaft whereby the said wheel spindles may be turned substantially at right angles to said axle shafts; wheels mounted on said axle spindles connected to said spindle shafts; and driving connections for said axle shafts.

27. The combination of the axle; spindles for said axle; yokes arranged in pairs on said axle and spindles; vertical pivots for said yokes; an axle shaft; spindle shafts; gears on said axle and spindle shafts arranged within said yokes; connecting gears for said axle and spindle shaft gears arranged on said pivots for said yokes, between the arms thereof; the diameter of said connecting gears being greater than that of said gears on said axle shaft whereby the said wheel spindles may be turned substantially at right angles to said axle shafts; wheels mounted on said axle spindles connected to said spindle shafts; and driving connections for said axle shafts.

28. The combination of the front and rear frames; a swivel connection for said frames; hollow axles; spindles for said axles; vertically-arranged pivots for connecting said spindles to said axles; steering shafts arranged in said axles; gears on the said steering shafts; gears secured to said spindle pivots and arranged to mesh with said gears on said steering shafts; wheels on the inner ends of said steering shafts, each having a radially-projecting pin thereon; a pair of adjustably-mounted plates curved in cross section to correspond with the peripheries of said wheels on said steering shafts, said plates having a pair of diagonally-arranged grooves in their inner faces adapted to receive said pins on said wheels, said grooves diverging in each direction from a central point, each groove being substantially straight on one side of its central point and curved on the other; a steering rod mounted on said swivel for connecting said frames; connecting cables for said steering rod to said plates whereby they are adjusted; and guide pulleys for said cables, the guide pulleys for the front plate being arranged on the said front frame and those for the rear plate being arranged on the said rear frame.

29. The combination of hollow axles; spindles for said axles; vertically-arranged pivots for connecting said spindles to said axles; steering shafts arranged in said axles; gears on the said steering shafts; gears secured to said spindle pivots and arranged to mesh with said gears on said steering shafts; wheels on the inner ends of said steering shafts, each having a radially-projecting pin thereon; a pair of adjustably-mounted plates curved in cross section to correspond with the peripheries of said wheels on said steering shafts, said plates having a pair of diagonally-arranged grooves in their inner faces adapted to receive said pins on said wheels, said grooves diverging in each direction from a central point, each groove being substantially straight on one side of its central point and curved on the other; a steering rod mounted above said swivel for connecting said frames; and connections for said steering rod to said plates whereby they are adjusted.

30. The combination of the front and rear frames; a swivel connection for said frames; hollow axles; spindles for said axles; vertically-arranged pivots for connecting said spindles to said axles; steering shafts arranged in said axles; gears on the said steering shafts; gears secured to said spindle pivots and arranged to mesh with said gears on said steering shafts; wheels on the inner ends of said steering shafts, each having a radially-projecting pin thereon; a pair of adjustably-mounted plates curved in cross section to correspond with the peripheries of said wheels on said steering shafts, said plates having a pair of diagonally-arranged grooves in their inner faces adapted to receive said pins on said wheels; a steering rod mounted above said swivel for connecting said frames; connecting cables for said steering rod to said plates whereby they are adjusted; and guide pulleys for said cables, the guide pulleys for the front plate being arranged on the said front frame and those for the rear plate being arranged on the said rear frame.

31. The combination of hollow axles; spindles for said axles; vertically-arranged pivots for connecting said spindles to said axles; steering shafts arranged in said axles; gears on the said steering shafts; gears secured to said spindle pivots and arranged to mesh with said gears on said steering shafts; wheels on the inner ends of said steering shafts, each having a radially-projecting pin thereon; a pair of adjustably-mounted plates curved in cross section to correspond with the peripheries of said wheels on said steering shafts, said plates having a pair of diagonally-arranged grooves in their inner faces adapted to receive said pins on said wheels; a steering rod; and connections for said steering rod to said plates whereby they are adjusted.

32. The combination of the hollow axle; spindles for said axle; vertically-arranged pivots for connecting said spindles to said axle; steering shafts arranged in said axle; gears on said steering shafts; gears secured to said spindle pivots and arranged to mesh with said gears on said steering shafts; a plate curved in cross section having a pair of diagonally-arranged grooves in its inner face, said grooves diverging in each direction from a central point, each groove being substantially straight on one side of its central point and curved on the other; pins carried by said steering shafts arranged to engage said grooves in said plate; and means for adjusting said plate.

33. The combination of the hollow axle; spindles for said axle; vertically-arranged pivots for connecting said spindles to said axle; steering shafts arranged in said axle; gears on said steering shafts; gears secured to said spindle pivots and arranged to mesh with said gears on said steering shafts; a plate curved in cross section having a pair of diagonally-arranged grooves in its inner face; pins carried by said steering shafts arranged to engage said grooves in said plate; and means for adjusting said plate.

34. The combination of the axle; spindles for said axle; vertically-arranged pivots for connecting said spindles to said axle; steering shafts; gears on said steering shafts; gears secured to said spindle pivots and arranged to mesh with said gears on said steering shafts; a plate curved in cross section having a pair of diagonally-arranged grooves in its inner face, said grooves diverging in each direction from a central point, each groove being substantially straight on one side of its central point and curved on the other; pins carried by said steering shafts arranged to engage said grooves in said plate; and means for adjusting said plate.

35. The combination of the axle; spindles for said axle; vertically-arranged pivots for connecting said spindles to said axle; steering shafts; gears on said steering shafts; gears secured to said spindle pivots and arranged to mesh with said gears on said steering shafts; a plate curved in cross section having a pair of diagonally-arranged grooves in its inner face; pins carried by said steering shafts arranged to engage said grooves in said plate; and means for adjusting said plate.

36. The combination of the hollow axle; spindles for said axle; vertically-arranged pivots for connecting said spindles to said axle; steering shafts arranged in said axle; gears on said steering shafts; gears secured to said spindle pivots and arranged to mesh with said gears on said steering shafts; and means for adjusting said steering shafts, whereby the axes of the spindles are maintained in proper relative position, for the purpose specified.

37. The combination of the axle; spindles for said axle; vertically-arranged pivots for connecting said spindles to said axle; steering shafts; gears on said steering shafts; gears secured to said spindle pivots and arranged to mesh with said gears on said steering shafts; and means for adjusting said steering shafts, whereby the axes of the spindles are maintained in proper relative position, for the purpose specified.

38. The combination of the hollow axle; spindles for said axle; vertically-arranged pivots for connecting said spindles to said axle; steering shafts arranged in said axle; gears on said steering shafts; gears secured to said spindle pivots and arranged to mesh with said gears on said steering shafts; and means for adjusting said steering shafts, for the purpose specified.

39. The combination of the axle; spindles for said axle; vertically-arranged pivots for connecting said spindles to said axle; steering shafts; gears on said steering shafts; gears secured to said spindle pivots and arranged to mesh with said gears on said steering shafts; and means for adjusting said steering shafts, for the purpose specified.

40. The combination of the axles; pivoted spindles therefor; traction wheels; a steering mechanism adapted to maintain the proper relative position of said wheels in turning to prevent skidding thereof; driving connections for said wheels embracing a variable speed mechanism; and connections for said variable speed mechanism to said steering gear, for the purpose specified.

41. In a motor vehicle, the combination with the axles, of pivoted spindles therefor; traction wheels; a steering mechanism driving connections for said wheels; and connections for the steering and driving mechanisms whereby the relative speed of the wheels is varied in turning, for the purpose specified.

42. The combination with an axle of a pivotal spindle therefor; steering shafts connected to said spindle; an adjustable member having grooves therein; said grooves diverging in each direction from a central point; and pins on said steering shafts arranged to engage said grooves, for the purpose specified.

43. The combination with a pair of hollow shafts; driving connections therefor consisting of wheels having rod-like spokes secured to said shafts; belt rim blocks slidably-mounted on said spokes; disks revolubly-mounted on said shafts, said disks having tangentially-arranged grooves on their inner faces adapted to engage said blocks, whereby, when said disks are adjusted, said blocks are shifted on said spokes to vary the belt rims; adjusting rods for said disks having spirally-arranged grooves therein, arranged in said shafts; pins on said disks arranged to engage said grooves in said rods whereby, when said rods are shifted longitudinally, said disks are adjusted, the said grooves being oppositely-arranged in said rods, so that the disks are adjusted oppositely; a connecting belt for said wheels; and connections for said adjusting rods whereby they are adjusted together.

44. The combination with a pair of shafts; driving connections therefor consisting of wheels having rod-like spokes secured to said shafts; belt rim blocks slidably-mounted on said spokes; disks revolubly-mounted on said shafts, said disks having tangentially-arranged grooves on their inner faces adapted to engage said blocks, whereby, when said disks are adjusted, said blocks are shifted on said spokes to vary the belt rims; means for adjusting said disks; and a connecting belt for said wheels.

In witness whereof, I have hereunto set my hand and seal in the presence of two witnesses.

EDWARD P. COOPER. [L. S.]

Witnesses:
    W. N. LONGWELL,
    CLARENCE GOODRICH.